United States Patent Office 3,832,236
Patented Aug. 27, 1974

3,832,236
PHOTOCONDUCTIVE CELL STRUCTURE
Hiroshi Tomita, Toyokawa, Japan, assignor to Minolta Camera Kabushiki Kaisha, Osaka-shi, Osaka-fu, Japan
Filed Aug. 24, 1972, Ser. No. 283,282
Claims priority, application Japan, Aug. 28, 1971, 46/77,183
Int. Cl. H01l 15/02
U.S. Cl. 136—89                    9 Claims

ABSTRACT OF THE DISCLOSURE

A photoconductive cell wherein a plurality of small projections are formed on one surface of an insulating thin plate provided with a number of notched portions on its periphery. The number of small projections are low and uniform in height and are made of a material similar to that of the insulating thin plate. A thin layer of a photoconductive material is formed on one surface of the thin insulating plate, exclusive of the portions at which the small projections are formed. Conductive layers are disposed in spaced relationship from each other on the photoconductive surface to constitute electrodes and extend through the notched portions, the small projections which extend upwardly from the photoconductive layer are spacer elements between the photoconductive surface and a transparent plate, when the insulating plate is inserted within the casing so that the photoconductive surface confronts the transparent plate of the casing. Lead wires are enclosed through the insulating side walls of the casing and electrically and mechanically connected with electrodes within the notched portions.

BACKGROUND OF THE INVENTION

The present invention relates to the construction of photoconductive cells, and more particularly to the construction of photoconductive cells wherein an insulating plate having a photoconductive surface and electrode surfaces is reliably retained within a casing.

There are structural requirements for a photoconductive cell such that the photoconductive surface thereof is formed on a thin insulating plate such as a ceramic plate and the thin insulating plate is retained within an adiabatic and airtight casing. Further, lead wires are connected with the photoconductive surface to form electrodes, and these lead wires are enclosed within the casing while maintaining an electrical connection outside of the casing.

Accordingly, in the conventional photoconductive cell, the ends of the lead wires which are enclosed within the casing are bonded to the photoconductive surface of the insulating plate by a conductive bond to provide electrodes. These lead wires support and retain the insulating plate spatially in relation to the casing as well as maintain the electrical connection with the outside of the casing. For this purpose, small holes, through which lead wires are inserted, must be provided on the insulating plate. Such a conventionally constructed photoconductive cell not only presents difficulty in the manufacture of the insulating plate but also fails to stabilize the insulating plate within the casing. Consequently, the insulating plate vibrates within the casing, resulting in frequent cracks on the insulating plate, and often culminating in the separation of the bonded portions of the lead wires with the photoconductive surface layer causing a defective electric connection.

Additionally, the utmost reduction in the thickness of the photoconductive cell is often desired especially for photoconductive cells incorporated in a camera or the like. In order to make the casing thinner, the space between the photoconductive surface and electrode as one structure and the transparent plate as the other structure of the casing, through which light is admitted into the photoconductive surface, must be decreased. For this purpose, the insulating plate must be stably mounted within the casing, because if the insulating plate is unstable and resultantly subject to vibration due to an unexpected impact, either the photoconductive surface or the electrodes come into contact with the transparent plate of the casing and damage the insulating plate.

In a known photoconductive cell the insulating plate, on one surface of which the photoconductive surface is formed, is fixed by bonding its back face to the base plate of the casing, and the ends of the lead wires which are enclosed within the side walls of the casing are bonded to the photoconductive surface by a conductive binding agent. A photoconductive cell constructed in such a manner virtually ensures stabilization of the insulating plate within the casing, eliminating such problems as defective electric connections between lead wires and the photoconductive surface, unwanted contact of the photoconductive surface and electrodes with the transparent plate of the casing, and the resultant damage which often occurs to the photoconductive surface and electrodes.

The known photoconductive cell of this type, notwithstanding the aforementioned advantages, is still disadvantageous with respect to its manufacture and in its adiabatic characteristics, because the major portions including the insulating plate and lead wires are located on the side of the base plate of the casing, and components located on the side of the transparent plate must be fusion welded to the casing. This is rather troublesome or complicated from the viewpoint of a manufacturing process. In order to simplify the manufacturing process, an increase in the thickness of the casing is inevitable. In addition to this, the fact that the insulating plate is bonded at its back face to the base of the casing adversely affects the adiabatic efficiency of the plate.

THE OBJECTS OF THE INVENTION

A first object of the present invention is to provide a thin photoconductive cell which completely eliminates the occurrence of a photoconductive surface and the electrodes which are formed on an insulating plate contacting with a transparent plate of the casing and thereby eliminating damage resulting from such contact.

A second object of the present invention is to provide a thin photoconductive cell of the type specified wherein the adiabatic characteristics of the photoelectric surface are maintained.

A third object of the present invention is to provide a thin photoconductive element wherein an insulating plate on which a photoconductive surface and electrodes are formed is fixedly retained relative to the casing, the electrical connection of lead wires with electrodes is ensured, and the manufacture of which is simplified.

A feature of the photoelectric cell of the invention is that spacers are interposed between a photoconductive surface and the electrodes, which are formed on an insulating plate, and a transparent plate of the casing, thereby preventing the photoconductive surface and electrodes from being damaged due to contact with the transparent plate. Additionally, the photoconductive surface is isolated adiabatically from the external environment. More specally, the spacers comprise a number of small projections formed on the insulating plate and abut against the transparent plate.

SUMMARY OF THE INVENTION

In the present invention in order to attain the aforementioned objects, a number of small projections having a low and uniform height are integrally formed around the circumference of one surface of a thin insulating plate provided with a number of notched portions on its lateral wall surfaces. A thin layer of a photoconductive material is formed throughout that one surface excepting those portions where the small projections are formed. A number of strips of a conductive material are disposed at the required spacing from each other on the photoconductive layer so as to constitute electrodes and each electrode extends through a respective notched portion. When the insulating plate is inserted within the casing so that the conductive layer surface is in confronting relationship with the transparent plate, the small upstanding projections on the surface of the insulating plate having the layer of photoconductive material form spacer elements between the conductive layer surface, the conductive strip material, and the transparent plate. The lead wires are within the casing by the insulating side walls of the casing in an airtight manner and are connected electrically and mechanically with the electrodes. The insulating plate which is mechanically connected with the lead wires is provided with a fixed spacing between the photoconductive surface, the electrodes, and the transparent plate of the casing by the number of small projections brought into contact with the transparent plate of the casing by the number of small purojections brought into contact with the transparent plate, thereby preventing both the photoconductive surface and electrodes from contacting the transparent plate, as well as maintaining the adiabatic characteristics of the photoconductive surface. In order to reinforce the mechanical support of the insulating plate within the casing, a binding agent is applied at places within gaps formed between the side walls of the casing and the lateral faces of the insulating plate, whereby the insulating plate is firmly bonded to the casing wall.

DETAILED DESCRIPTION OF THE INVENTION

Figure 1:
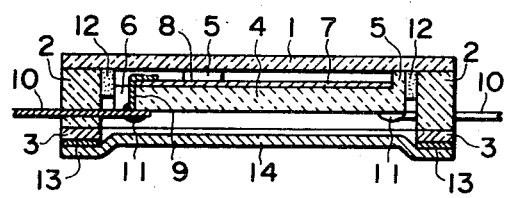
FIG. 1 is a sectional side view of a preferred embodiment of a photoconductive cell according to the present invention.
Figure 2:
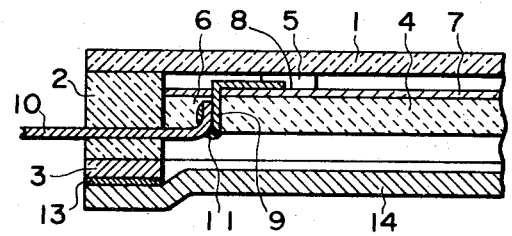
FIG. 2 is a sectional side view of a modification of the embodiment shown in FIG. 1.

A casing of a photoconductive cell partially comprises transparent glass plate 1 and side frames 2 made of a glass material, the one end faces of which are fusion welded around the circumference of the interior surface of transparent glass plate 1, as shown in FIGS. 1 and 2. Each of lead wires 10 extends through a respective side frame 2 and is enclosed within the casing. Metallic frames 3 are fusion welded to the other end faces of side frames 2 as seen in FIGS. 1 through 4. Metallic frames 3 are made of a material having a coefficient of thermal expansion similar to that of side frames 2. The casing of the photoconductive cell is thus partially constructed.

A photoconductive cell which is mounted within the casing comprises a photoconductive layer 7 formed on one surface of insulating plate 4 made of a ceramic or like material and divided into electrode surfaces 8 on both sides of the layer. A number of small projections 5 extend slightly upwardly from electrode surfaces 8 and are formed integrally therewith. Projections 5 are uniform in height and serve as spacer elements.

Insulating plate 4 is provided with a number of notched portions 6 cut from the periphery of the insulating plate and within which are formed angled conductive members 9 extending over electrode surfaces 8 in contacting relationship therewith and across the side surface of the insulating plate.

Figure 3:
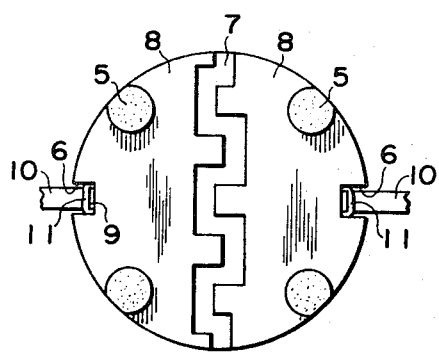
FIG. 3 is a plan view showing the structure of a photoconductive surface having two electrodes and two electrode surfaces and the lead wires thereto.

The photoconductive cell constructed as described above is mounted within the casing so that the photoconductive layer thereof confronts transparent glass plate 1 with small projections 5 contacting the interior face of transparent glass plate 1. Next, one end of each lead wire 10, which extends in an airtight manner through each side frame wall 2 into the casing, is bent as shown in FIGS. 2 and 3 to contact with a conductive member 9 within notched portion 6 of insulating plate 4, and bonded to said conductive portion by a conductive bonding 11 such as solder. Alternatively, as shown in FIG. 1, the end of each lead wire 10 may contact with a portion of the back face of insulating plate 4 which is located within notched portion 6, and then, bonded to conductive member 9 by conductive bonding 11.

Two methods of mechanically retaining the insulating plate in place within the casing are applicable. One method is to frictionally support the insulating plate by forcing it to butt against the interior walls of side frames 2 of the casing. This causes only a slight adverse affect of the adiabatic characteristics of photoconductive layer surface 7, although an almost imperceptible thermal change due to heat takes place on the layer surface. If such a slight thermal change is critical, the other method may be used, in which as shown in FIG. 1 gaps are formed between side frames 2 and the lateral walls of the insulating plate 4, and a binding agent 12 having adiabatic and insulating properties is applied at places within each of the gaps, thereby to securely bond insulating plate 4 to the casing.

These methods are reliable to provide for the mechanical support of the insulating plate within the casing, and neither interferes with the lead wire attachment, since each lead wire is bonded at a respective end thereof to a respective conductive member 9 within notched portion 6, or to the back face of insulating plate 4 in contact with a conductive member 9 within the notched portion 6. Further, there is no adverse effect with respect to the electrical connection between the lead wires 10 and electrode surfaces 8, and therefore no problem with defective electrical conduction therebetween.

After the photoconductive cell is accommodated within the casing according to the procedures as set forth above, a metallic base cover plate 14 is bonded by solder 13 or the like to the metallic frames 3 fusion welded to side frames 2 of the casing. Base cover plate 14 is made of a metallic material similar to metallic frames 3 and has substantially an identical outer shape therewith. Thus, the photoconductive cell is hermetically enclosed within the casing.

The assembly of the casing, and especially the welding of the junctions between the glass plates and the metallic plate with the glass plate, which are accompanied by high temperature conditions, is performed prior to the insertion of insulating plate 4 in the casing. Subsequently, other bonding or welding operations, for example, soldering, for providing the electrical connection of lead wires 10 with the conductive members 9, and the joining of metallic plate 3 with the base cover plate 14 of the same metallic material, which are carried out with comparatively low temperature conditions, are performed. Accordingly, the possibility of causing any harm to photoconductive surface 7 which may arise at the time of assembling, and lowering the performance capabilities of the photocell are completely eliminated or substantially reduced.

The photoconductive cell constructed in accordance with the invention stabilizes the photoconductive surface within the casing; reduces the thickness of the casing to the utmost; and enables a number of lead wires to be attached in any direction as necessary. The photoconductive cell of this invention may be easily modified to the plug-in type without departing from the scope of invention.

Figure 4:
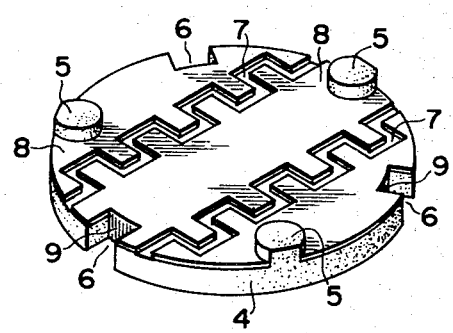
FIG. 4 is a perspective view showing an exemplary structure of an insulating plate on which a photoconductive surface having three electrodes and three electrode surfaces is formed.

FIG. 3 shows a photoconductive cell having two electrodes, wherein two notched portions 6 are provided. FIG. 4 shows a further embodiment of a photoconductive cell having three electrodes, wherein the photoconductive layer 7 is divided into three electrode surfaces 8 and three notched portions 6 are correspondingly provided.

The photoconductive cell of the present invention constructed as set forth in the foregoing description provides many advantages. First, the photoconductive cell is firmly retained in place within the casing, and accordingly, it is isolated from vibration if an external impact is given thereto. Secondly, small projections serving as spacer elements constantly maintain a minute spacing between the transparent glass plate and the surfaces of photoconductive electrode surfaces and the connecting electrode structure. Further, the electrical connection is ensured, since the lead wires are welded either within notched portions or to the back face of the insulating plate. Finally, the effective area of the photelectric layer surface is increased. Thus, an extremely compact, flat, miniaturized photoconductive cell is obtained.

What is claimed is:

1. A photoconductive cell, comprising:
   an insulating plate having a number of notched portions in spaced relationship along the periphery thereof;
   a number of small projections of uniform height integrally formed in selected peripheral portions on one surface of said insulating plate and extending substantially normal to said one surface;
   a layer of photoconductive material formed on said one surface and divided into a number of separate electrode surfaces;
   conductive members of the same number as said electrode surfaces and respectively electrically connected thereto and each conductive member extending within a respective one of said notched portions.

2. A photoconductive cell as in claim 1, wherein said insulating plate includes two of said notched portions; and said photoconductive layer is divided into two of said electrode surfaces.

3. A photoconductive cell as in claim 1, wherein said insulating plate includes three of said notched portions; and said photoconductive layer is divided into three of said electrode surfaces.

4. A photoelectric cell as in claim 1, further comprising a transparent plate, a side wall member having end faces and one end face is welded to the periphery of said transparent plate; means for mounting said insulating plate with respect to said transparent plate and said side wall member so that said photoconductive layer confronts said transparent plate and said number of projections are in contact with said transparent plate to form a space between said transparent plate and said photoconductive layer and said conductive members; a frame member bonded to the other of said end faces; and a base plate enclosing said frame member and bonded at the edge portions of said frame member by a conductive bonding material.

5. A photoconductive cell as in claim 4, wherein said means for mounting are the sides of said insulating plate engaging said side wall member in frictional contact.

6. A photoconductive cell as in claim 4, wherein a space is formed between the periphery of said insulating plate and said side wall member; and said means for mounting includes a bonding agent having insulating and adiabatic properties connecting said insulating plate and said side wall member within said space at spaced intervals therein.

7. A photoconductive cell as in claim 4, further comprising electrode elements equal in number to said conductive members, said electrode elements are each electrically connected to a respective one of said conductive members and extending within a respective one of said notched portions and hermetically through said side wall member.

8. A photoconductive cell as in claim 7 wherein each of said conductive elements is an angled member having two arms and mounted to said insulating plate so that one of said arms extends over said photoconductive surface, the other of said arms extends across the side face of said insulating plate; each of said electrode elements extends through said side wall member and a respective one of said notched portions to a second surface of said insulating plate opposite said one surface; and said electrode elements are electrically connected to said conductive members at the juncture of said other arm and said second surface.

9. A photoconductive cell as in claim 7 wherein each of said conductive elements is an angled member having two arms and mounted to said insulating plate so that one of said arms extends over said photoconductive surface, the other of said arms extends across the side face of said insulating plate; each of said electrode elements has an angled end portion; and said angled end portion is electrically connected to said other arm.

References Cited
UNITED STATES PATENTS

| | | | |
|---|---|---|---|
| 2,849,520 | 8/1958 | Picciano | 136—89 |
| 2,999,240 | 9/1961 | Nicoll | 136—89 |
| 3,062,958 | 11/1962 | Warner | 136—89 X |
| 3,177,576 | 4/1965 | Kuzminski | 136—89 X |
| 3,633,144 | 1/1972 | Yoshiyama et al. | 136—89 X |

ALLEN B. CURTIS, Primary Examiner